(12) United States Patent
Song et al.

(10) Patent No.: US 7,686,968 B2
(45) Date of Patent: Mar. 30, 2010

(54) COMPOSITION FOR REMOVING CONDUCTIVE MATERIALS AND MANUFACTURING METHOD OF ARRAY SUBSTRATE USING THE SAME

(75) Inventors: Kye-Chan Song, Annyang-si (KR); Jong-Il Kim, Annyang-si (KR); Kyoung-Mook Lee, Seoul (KR); Sam-Young Cho, Hwaseong-si (KR); Hyun-Cheol Shin, Suwon-si (KR); Nam-Seo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 778 days.

(21) Appl. No.: 11/452,387

(22) Filed: Jun. 14, 2006

(65) Prior Publication Data

US 2006/0289383 A1 Dec. 28, 2006

(30) Foreign Application Priority Data

Jun. 28, 2005 (KR) .................. 10-2005-0056493

(51) Int. Cl.
G02F 1/1333 (2006.01)

(52) U.S. Cl. .................. 216/5; 216/23; 216/24; 216/83; 216/95; 216/100; 216/101; 216/108; 438/99; 438/151

(58) Field of Classification Search .......... 216/23
See application file for complete search history.

(56) References Cited

U.S. PATENT DOCUMENTS 4,158,710 A * 6/1979 Gierek et al. .............. 427/310
5,340,491 A * 8/1994 Enomoto et al. ........... 252/79.1
7,371,622 B2 * 5/2008 Park et al. .................. 438/151
2001/0030170 A1 * 10/2001 Takaki et al. ............... 216/23

FOREIGN PATENT DOCUMENTS

| JP | 10-330969 A | 12/1998 |
|---|---|---|
| JP | 2005-163070 A | 6/2005 |
| KR | 2001-0091799 | 10/2001 |
| KR | 2002-0091485 | 12/2002 |
| KR | 2004-0014183 | 2/2004 |

OTHER PUBLICATIONS

KR 10-2001-077228 A, Kim, G. S. et al, abstract only, "Etchant for etching tri-layered metallic film of Mo/Al-Nd/Mo" Aug. 17, 2001.*
KR 2007-114471 A, Cho, S. Y. et al, abstract only, "Etchant for etching aluminum, molybdenum and indium-tin oxide layers in a single etching system" Dec. 4, 2007.*
KR 2007-108643 A, Cho, S.Y. et al, abstract only, "Etchant for etching aluminum, molybdenum, and indium tin oxide, which is capable of simplifying an etching process when a liquid crystal display device is manufactured" Nov. 13, 2007.*

* cited by examiner

*Primary Examiner*—Anita K Alanko
(74) *Attorney, Agent, or Firm*—McKenna Long & Aldridge LLP

(57) ABSTRACT

A composition for removing a conductive material and a manufacturing method of an array substrate using the composition, wherein the composition may include a nitric acid of about 3 to 15 wt %, a phosphoric acid of about 40 to 70 wt %, an acetic acid of about 5 to 35 wt %. The composition may further include a chlorine compound of about 0.05 to 5 wt %, a chlorine stabilizer of about 0.01 to 5 wt %, a pH stabilizer of about 0.01 to 5 wt %, and water of residual quantity.

23 Claims, 8 Drawing Sheets

COMPOSITION FOR REMOVING CONDUCTIVE MATERIALS AND MANUFACTURING METHOD OF ARRAY SUBSTRATE USING THE SAME

This application claims the benefit of Korean Patent Application No. 10-2005-0056493, filed in Korea on Jun. 28, 2005, which is hereby incorporated by reference for all purposes as if fully set forth herein.

BACKGROUND OF THE INVENTION

1. Field of the Invention

The present invention relates to a composition for removing conductive materials. More particularly, the present invention relates to a composition for removing all of aluminum, molybdenum and indium tin oxide and a manufacturing method of an array substrate using the same.

2. Discussion of the Related Art

Liquid crystal display devices are widely used flat panel display devices. A liquid crystal display (LCD) device includes an upper substrate, a lower substrate and a liquid crystal layer interposed therebetween. Electrodes are formed on the upper substrate and the lower substrate, respectively. When a voltage is applied to the electrodes, an electric field is induced between the electrodes. Liquid crystal molecules of the liquid crystal layer are rearranged according to the electric field to thereby control the transmittance of light through the liquid crystal molecules.

FIG. 1 is a cross-sectional view of an array substrate for an LCD device according to the related art.

As shown in FIG. 1, a gate electrode 14 is formed on a transparent substrate 12 by depositing a first metal layer and then patterning it through a first mask process. The first metal layer may include a conductive metallic material, such as aluminum (Al), an aluminum alloy such as AlNd, molybdenum (Mo), tungsten (W) or chromium (Cr). An aluminum alloy, such as AlNd, having a low resistivity may also be included. The gate electrode 14 may also have a double-layered structure including an aluminum alloy, such as AlNd, and molybdenum (Mo) as illustrated. Although not shown, in the first mask process, a photoresist (PR) layer is formed on the first metal layer. The PR layer may be a positive type PR in which a portion exposed to light is removed after developing or a negative type PR in which a portion not exposed to light is removed after developing. A mask including a light-transmitting portion and a light-blocking portion is disposed over the PR layer. The PR layer is exposed to light through the mask and then is developed to form a PR pattern selectively exposing the first metal layer. The first metal layer may be wet-etched or dry-etched by an etchant using the PR pattern as an etching mask, and thus the gate electrode 14 is formed. Next, the PR pattern is removed through a process, such as an ashing process or a stripping process.

A gate insulating layer 16 is formed on the substrate 12 including the gate electrode 14 thereon. The gate insulating layer 16 may include an inorganic insulating material, such as silicon nitride ($SiN_x$) or silicon oxide ($SiO_2$).

An active layer 18, an ohmic contact layer 20 and source and drain electrodes 22a and 22b are formed on the gate insulating layer 16 by depositing and then patterning an intrinsic amorphous silicon layer, an impurity-doped amorphous silicon layer and a second metal layer through a second mask process. The second metal layer may include molybdenum (Mo). In the second mask process, a PR layer is formed on the second metal layer, and a mask is disposed over the PR layer. The PR layer is exposed to light through the mask and then is developed to form a PR pattern selectively exposing the second metal layer. The second metal layer may be wet-etched or dry-etched by an etchant. The impurity-doped amorphous silicon layer and the intrinsic amorphous silicon layer may be sequentially dry-etched to thereby form the active layer 18, the ohmic contact layer 20 and the source and drain electrodes 22a and 22b. Here, the etchant may be a solution including hydrogen peroxide ($H_2O_2$). Next, the PR pattern is removed by a process, such as an ashing process or a stripping process.

A passivation layer 24 is formed on the substrate 12 including the active layer 18, the ohmic contact layer 20 and the source and drain electrodes 22a and 22b by coating a transparent organic insulating material, such as benzocyclobutene (BCB) or acrylic resin, or depositing an inorganic insulating material, such as silicon nitride ($SiN_x$) or silicon oxide ($SiO_2$). The passivation layer 24 is patterned through a third mask process to thereby form a contact hole 26 exposing a part of the drain electrode 22b.

A pixel electrode 28 may be formed on the passivation layer 24 by depositing a transparent conductive material such as indium tin oxide (ITO) and then patterning it through a fourth mask process. The pixel electrode 28 contacts the drain electrode 22b via the contact hole 26. The fourth mask process may include a wet-etching process or a dry-etching process similar to the first and second mask processes. In the fourth mask process, a nitrohydrochloric acid or an oxalic acid may be used as etchant for forming the pixel electrode 28.

As described previously, an array substrate for a liquid crystal display device may be manufactured through four-mask processes. Because different kinds of etchant are used in respective mask processes for forming the metallic patterns, such as the gate electrode 14, the source and drain electrodes 22a and 22b and the pixel electrode 28, various facilities are required. Accordingly, productivity is lowered, and costs for the facilities are increased.

SUMMARY OF THE INVENTION

Accordingly, the present invention is directed to a composition for removing conductive materials and a manufacturing method of an array substrate using the same that substantially obviates one or more of the problems due to limitations and disadvantages of the related art.

An advantage of the present invention is to provide a composition for removing conductive materials and a manufacturing method of an array substrate using the same that reduce manufacturing costs and increase productivity.

Additional features and advantages of the invention will be set forth in the description which follows, and in part will be apparent from the description, or may be learned by practice of the invention. The objectives and other advantages of the invention will be realized and attained by the composition and method particularly pointed out in the written description and claims hereof as well as the appended drawings.

To achieve these and other advantages and in accordance with the purpose of the present invention, as embodied and broadly described, a composition for removing a conductive material includes a nitric acid of about 3 to 15 wt %, a phosphoric acid of about 40 to 70 wt %, an acetic acid of about 5 to 35 wt %, a chlorine compound of about 0.05 to 5 wt %, a chlorine stabilizer of about 0.01 to 5 wt %, a pH stabilizer of about 0.01 to 5 wt %, and water of residual quantity.

In another aspect of the present invention, a manufacturing method of an array substrate for a liquid crystal display device using a composition for removing conductive materials that includes a nitric acid of about 3 to 15 wt %, a phosphoric acid of about 40 to 70 wt %, an acetic acid of about 5 to 35 wt %, a chlorine compound of about 0.05 to 5 wt %, a chlorine stabilizer of about 0.01 to 5 wt %, a pH stabilizer of about 0.01 to 5 wt %, and water of residual quantity, includes forming a gate electrode on a substrate by etching a first metal layer using the composition, forming a gate insulating layer on the gate electrode, forming a semiconductor layer on the gate insulating layer, forming source and drain electrodes on the semiconductor layer by etching a second metal layer using the composition, forming a passivation layer on the source and drain electrodes, the passivation layer having a contact hole exposing the drain electrode, and forming a pixel electrode on the passivation layer by etching a third metal layer using the composition.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to exemplary embodiments of the present invention, examples of which are illustrated in the accompanying drawings.

Figure 1:
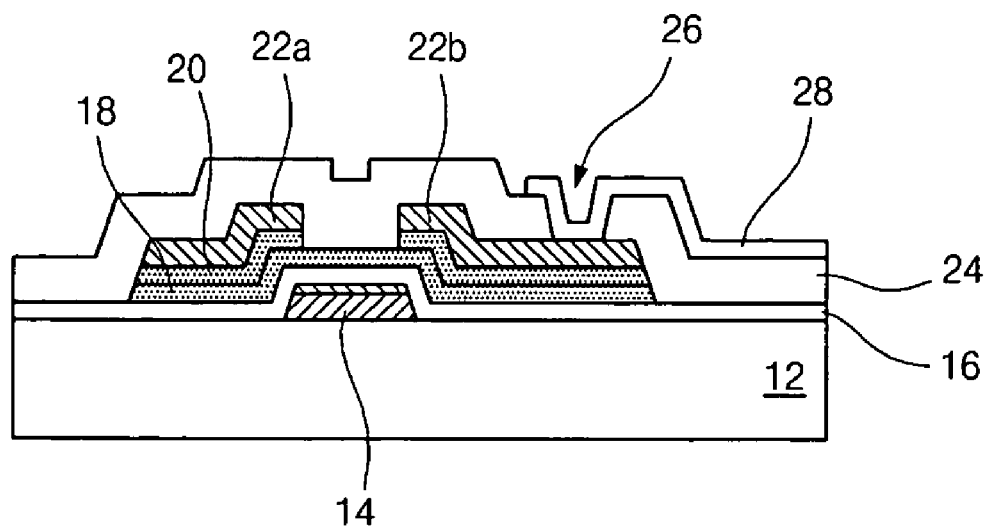
FIG. 1 is a cross-sectional view of an array substrate for a liquid crystal display (LCD) device according to the related art.
Figure 2:
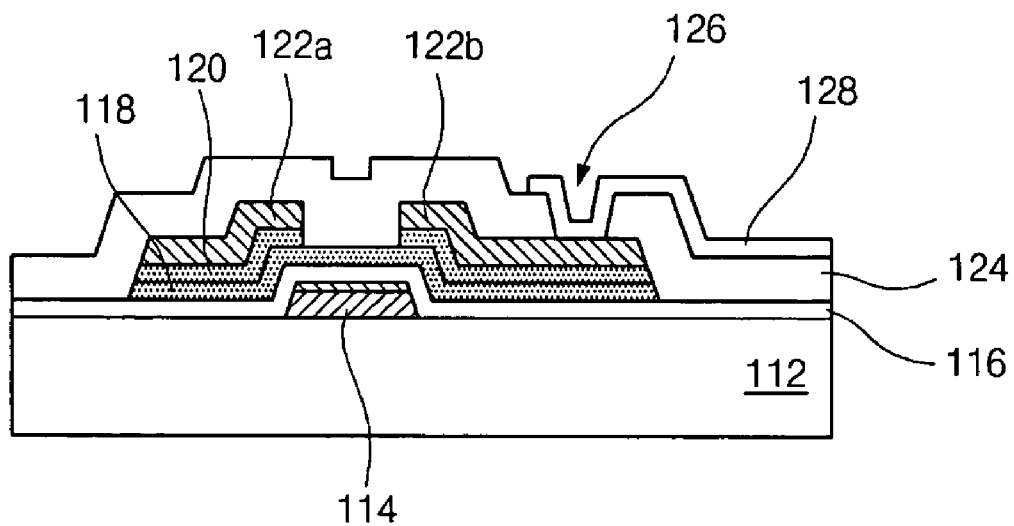
FIG. 2 is a cross-sectional view of an array substrate for an LCD device according to an exemplary embodiment of the present invention.

FIG. 2 is a cross-sectional view of an array substrate for an LCD device according to an exemplary embodiment of the present invention.

As illustrated in FIG. 2, a gate electrode 114 is formed on a transparent substrate 112 by depositing a first metal layer and then patterning it through a first mask process. The first metal layer may have a single-layered structure or a double-layered structure of aluminum alloy, such as AlNd, or molybdenum (Mo). In the first mask process, although not shown, a photoresist (PR) layer is formed on the first metal layer by coating the PR layer. The PR layer may be a positive type PR in which a portion exposed to light is removed after developing or a negative type PR in which a portion not exposed to light is removed after developing. A mask including a light-transmitting portion and a light-blocking portion is disposed over the PR layer. The PR layer is exposed to light through the mask and then is developed to form a PR pattern selectively exposing the first metal layer. The first metal layer may be wet-etched by a first etchant using the PR pattern as an etching mask, and thus the gate electrode 114 is formed. The first etchant may include a nitric acid of about 3 to 15 wt %, a phosphoric acid of about 40 to 70 wt %, and an acetic acid of about 5 to 35 wt % as main components. The first etchant may further include a chlorine compound of about 0.05 to 5 wt %, a chlorine stabilizer of about 0.01 to 5 wt %, a pH stabilizer of about 0.01 to 5 wt %, and water of residual quantity. Next, the PR pattern is removed through a process, such as an ashing process or a stripping process.

The etching process may occur at a temperature of about 30 to 50 degrees Celsius. The etching process duration depends on the thickness and type of material of the first metal layer, i.e., single or double layered structure.

A gate insulating layer 116 is formed on the substrate 112 including the gate electrode 114 thereon by depositing an inorganic insulating material, such as silicon nitride ($SiN_x$) or silicon oxide ($SiO_2$).

An active layer 118, an ohmic contact layer 120 and source and drain electrodes 122a and 122b are formed on the gate insulating layer 116 by depositing an intrinsic amorphous silicon layer, an impurity-doped amorphous silicon layer and a second metal layer and then patterning them through a second mask process. The second metal layer may include molybdenum (Mo) or an aluminum alloy. In the second mask process, a PR layer is formed on the second metal layer, and a mask is disposed over the PR layer. The PR layer is exposed to light through the mask and then is developed to form a PR pattern selectively exposing the second metal layer. The second metal layer may be wet-etched by a second etchant, and the impurity-doped amorphous silicon layer and the intrinsic amorphous silicon layer may be sequentially dry-etched, thereby forming the active layer 118, the ohmic contact layer 120 and the source and drain electrodes 122a and 122b. To remove the impurity-doped amorphous silicon layer to form a channel region, the PR pattern may have two thicknesses. The two thicknesses in the PR pattern may be formed by using a mask having a half-tone portion or a mask having a slit portion. The second etchant may include the same components as the first etchant. Then, the PR pattern is removed by a process, such as an ashing process or a stripping process.

The etching process may occur at a temperature of about 30 to 50 degrees Celsius. The etching process duration depends on the thickness and type of material of the second metal layer.

A passivation layer 124 is formed on the substrate 112 including the active layer 118, the ohmic contact layer 120 and the source and drain electrodes 122a and 122b thereon by coating a transparent organic insulating material, such as benzocyclobutene (BCB) or acrylic resin, or depositing an inorganic insulating material, such as silicon nitride ($SiN_x$) or silicon oxide ($SiO_2$). The passivation layer 124 is patterned through a third mask process to thereby form a contact hole 126 exposing a part of the drain electrode 122b.

A pixel electrode 128 is formed on the passivation layer 124 by depositing a transparent conductive material such as indium tin oxide (ITO) and then patterning it through a fourth mask process. The pixel electrode 128 contacts the drain electrode 122b via the contact hole 126. The fourth mask process uses a third etchant and may include a wet-etching process similar to the first and second mask processes. The third etchant may include the same components as the first etchant and the second etchant. Then, the remaining PR pattern, used for forming the pixel electrode 128, is removed by a process, such as an ashing process or a stripping process.

The etching process may occur at a temperature of about 30 to 50 degrees Celsius. The etching process duration depends on the thickness of the transparent conductive material.

In the present invention, it is easy to manage the etchant when manufacturing an array substrate for a liquid crystal display device because a single etchant is used in the different individual mask processes for forming the metallic patterns, such as the gate electrode 114, the source and drain electrodes 122a and 122b and the pixel electrode 128. In addition, manufacturing costs are decreased due to the use of a single wet bath, and productivity is increased.

Meanwhile, although the above array substrate is manufactured through four-mask processes, the number of mask processes may be changed.

As stated above, an etchant according to an exemplary embodiment of the present invention removes all of aluminum (Al), molybdenum (Mo) and indium tin oxide (ITO). The etchant includes a nitric acid of about 3 to 15 wt %, a phosphoric acid of about 40 to 70 wt %, and an acetic acid of about 5 to 35 wt % as the main components. The etchant further includes a chlorine compound of about 0.05 to 5 wt %, a chlorine stabilizer of about 0.01 to 5 wt %, a pH stabilizer of about 0.01 to 5 wt %, and water of residual quantity.

The nitric acid acts upon aluminum to form aluminum oxide ($Al_2O_3$). When the content of the nitric acid is within a range of about 3 to 15 wt %, the nitric acid effectively controls the etching selectivity between the upper molybdenum (Mo) layer and the lower aluminum alloy layer of the double layer. The aluminum alloy may be AlNd. However, when the content of the nitric acid is less than 3 wt %, the lower aluminum alloy, such as AlNd, of the double layer is over-etched, and there may be an undercut phenomenon. The undercut phenomenon may be caused by galvanic corrosion. The galvanic corrosion may occur due to a local cell or a galvanic cell when dissimilar metallic materials are electrically connected in an aqueous solution. More particularly, the metallic materials assume different corrosion potentials. A base material, for example, Al (E=−1.66V), acts as an anode and tends to undergo accelerated corrosion, while a noble material, for example, Mo (E=−0.20V), functions as a cathode and tends to experience reduced corrosion effect. Accordingly, galvanic corrosion occurs. Patterns for the gate electrode are not uniformly formed due to the galvanic corrosion. Thus, the patterns cause problems, such as difficulties in displaying high resolution and clear color images.

The phosphoric acid decomposes aluminum oxide ($Al_2O_3$). When the content of the phosphoric acid is within a range of about 40 to 70 wt %, aluminum oxide ($Al_2O_3$), which may be formed by reaction between a nitric acid and aluminum, is properly dissolved, and the lower aluminum layer of the gate electrode is etched rapidly. Accordingly, the etch rate increases, and thus, productivity is increased.

The acetic acid acts as a buffer controlling a reaction rate. When the content of the acetic acid is within a range of about 5 to 35 wt %, by adequately adjusting the reaction rate, the etch rate is increased, and the productivity is increased. However, when the content of the acetic acid is less than about 5 wt %, there may be an undercut phenomenon in the double layer of molybdenum (Mo) and the aluminum alloy, which may be AlNd.

The chlorine compound may be dissociated into $Cl^{-1}$ and includes at least one of KCl, HCl, LiCl, $NH_4Cl$, $CuCl_2$, $FeCl_3$, $FeCl_2$, $CaCl_2$, $CoCl_2$, $NiCl_2$, $ZnCl_2$, $AlCl_3$, $BaCl_2$, $BeCl_2$, $BiCl_3$, $CdCl_2$, $CeCl_2$, $CsCl_2$, $H_2PtCl_6$, and $CrCl_3$. When the content of the chlorine compound is within a range of about 0.05 to 5 wt %, the chlorine compound controls the etch rates of indium tin oxide (ITO), molybdenum (Mo), and the double layer of molybdenum (Mo) and the aluminum alloy, which may be AlNd. In addition, there is no undercut phenomenon of the lower aluminum alloy layer of the double layer, and patterns of indium tin oxide (ITO) and molybdenum (Mo) have good profiles.

The chlorine stabilizer includes a Zn compound, a Cd compound, a Pb compound, a Ba compound and an oleic acid. The Zn compound includes at least one of $ZnCl_2$, $Zn(NO_3)_2$, $Zn(CH_3COO)_2$, $Zn(C_{17}H_{35}COO)_2$, $C_2H_2O_4Zn$, $Zn_3(PO_4)_2$, and $Zn(CO_3)$. The Cd compound includes at least one of $Cd(CH_3COO)_2$, $CdCl_2$, $CdI_2$, $Cd(NO_3)_2$, and $Cd(CO_3)$. The Pb compound includes at least one of $Pb(CH_3COO)_2$, $C_{12}H_{10}O_{14}Pb_3$, $PbI_4$, $Pb(NO_3)_2$, and $Pb(C_{17}H_{35}COO)_2$. The Ba compound includes at least one of $Ba(CH_3COO)_2$, $BaCO_3$, $BaCl_2$, $BaI_2$, $Ba(NO_3)_2$, and $Ba(H_2PO_4)_2$. When the content of the chlorine stabilizer is within a range of about 0.01 to 5 wt %, the chlorine stabilizer adjusts an etch rate of indium tin oxide (ITO) such that a profile of an indium tin oxide pattern has an inclined angle less than about 60 degrees. Moreover, the chlorine stabilizer lengthens a lifespan of the etchant to thereby increase process margins.

The pH stabilizer is a base compound that may be dissociated into OH—. The pH stabilizer includes at least one of NaOH, KOH, LiOH, $Ca(OH_2)$, $Al(OH)_3$, $Mg(OH)_2$, $Ba(OH)_2$, $Co(OH)_2$, $Cu(OH)_2$, $Ni(OH)_2$, $Zr(OH)_2$, and $Zn(OH)_2$). When the content of the pH stabilizer is within a range of about 0.01 to 5 wt %, the pH stabilizer controls etch rates of molybdenum (Mo) and the double layer of molybdenum (Mo) and an aluminum alloy, such as AlNd, so that there is no undercut phenomenon of the lower aluminum alloy layer in the double layer. In addition, patterns of indium tin oxide (ITO) and molybdenum (Mo) have good profiles due to the pH stabilizer.

The water of residual quantity decomposes aluminum oxide ($Al_2O_3$) formed by the reaction between the nitric acid and aluminum and dilutes the etching compositions. Beneficially, the water may be pure water filtered through an ion exchange resin. More particularly, the water may be de-ionized water having resistivity more than 18 MΩ·cm.

Figure 3A:
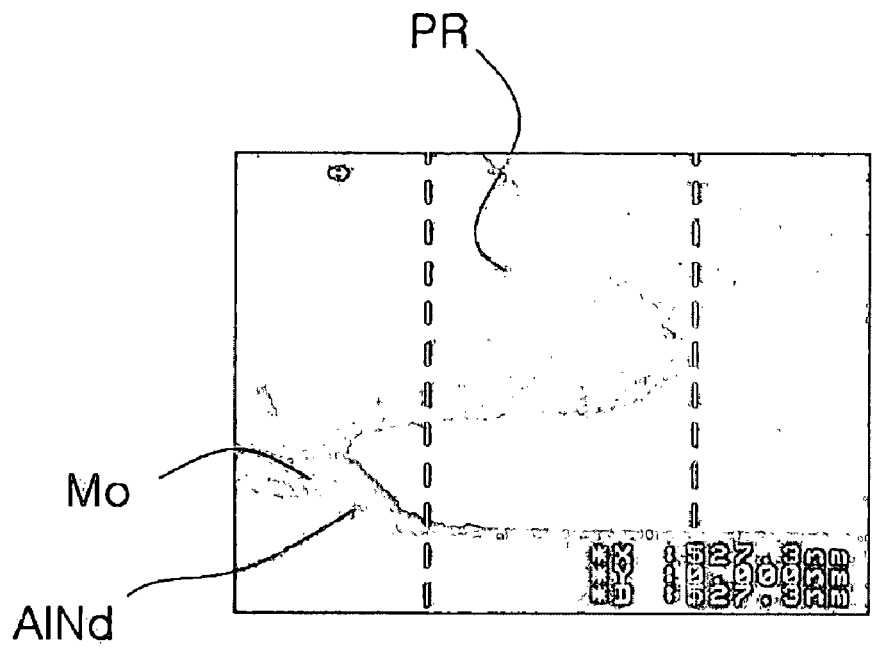
FIG. 3A is a scanning electron microscopy (SEM) image illustrating a cross-section of a double layer of molybdenum and an aluminum alloy wet-etched by an etchant according to an exemplary embodiment of the present invention.
Figure 3B:
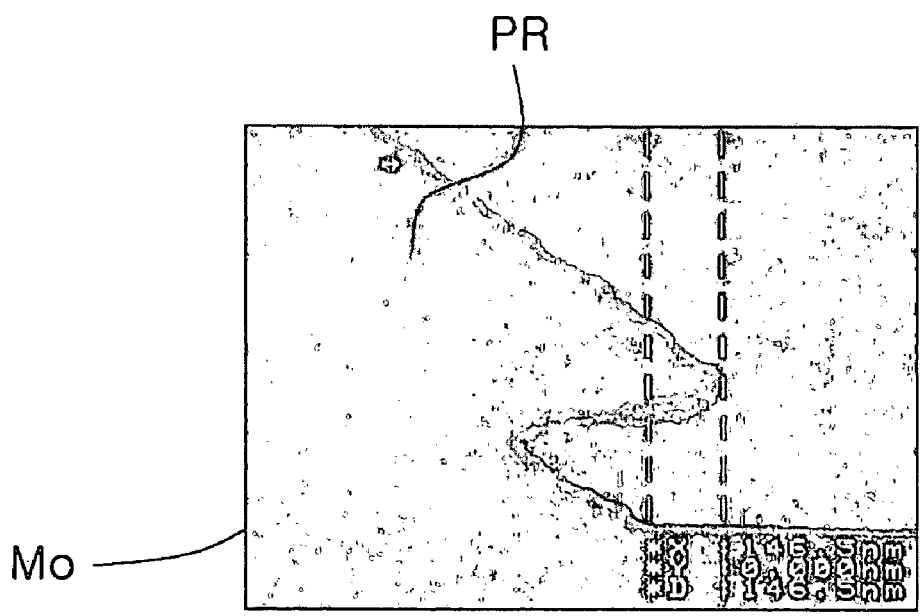
FIG. 3B is a scanning electron microscopy (SEM) image illustrating a cross-section of a molybdenum layer wet-etched by an etchant according to an exemplary embodiment of the present invention.
Figure 3C:
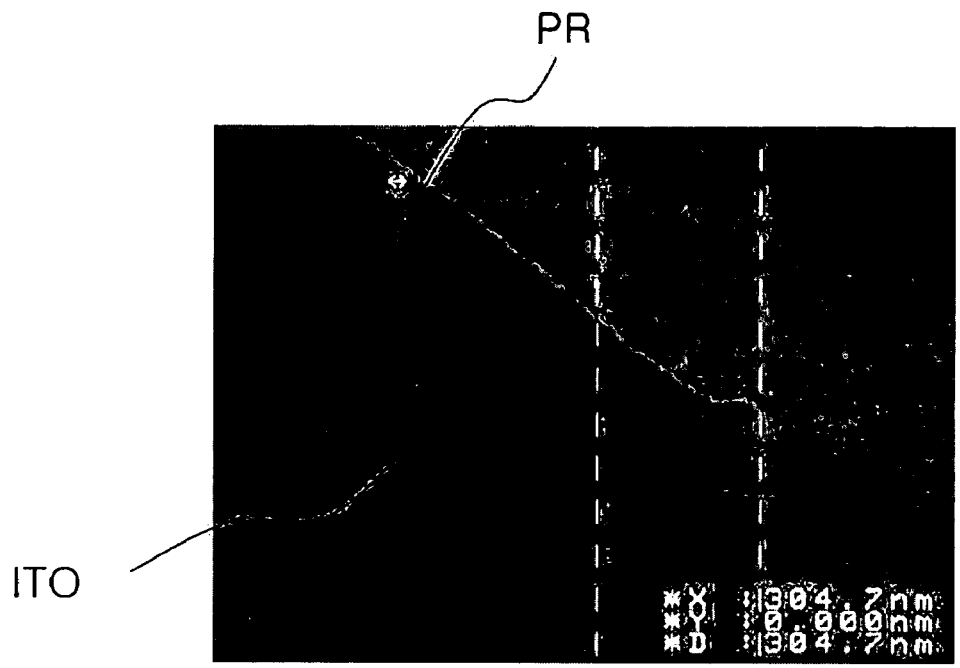
FIG. 3C is a scanning electron microscopy (SEM) image illustrating a cross-section of an indium tin oxide layer wet-etched by an etchant according to an exemplary embodiment of the present invention.

FIG. 3A is a scanning electron microscopy (SEM) image illustrating a cross-section of a double layer of molybdenum (Mo) and the aluminum alloy AlNd for a gate electrode wet-etched by the etchant according to an exemplary embodiment of the present invention. FIG. 3B is an SEM image illustrating a cross-section of a molybdenum (Mo) layer for source and drain electrodes wet-etched by the etchant according to an exemplary embodiment of the present invention. FIG. 3C is an SEM image illustrating a cross-section of an indium tin oxide (ITO) layer for a pixel electrode wet-etched by the etchant according to an exemplary embodiment of the present invention. A PR pattern is shown. The etchant may include a nitric acid of about 8 wt %, a phosphoric acid of about 60 wt %, and an acetic acid of about 16 wt %. Further, the etchant may include a chlorine compound of about 1 wt %, a chlorine stabilizer of about 1 wt %, a pH stabilizer of about 1 wt %, and water of about 13 wt %.

In FIG. 3A, the double layer of molybdenum (Mo) and the aluminum alloy AlNd has a profile without undercut. In FIG. 3B, a profile of the molybdenum (Mo) layer is tapered with an inclined angle of about 45 to 70 degrees. In FIG. 3C, a profile of the indium tin oxide (ITO) layer is tapered with an inclined angle of about 30 to 60 degrees. That is, when the gate electrode, the source and drain electrodes, and the pixel electrode are formed, the electrodes have good profiles inclined with angles of about 40 to 70 degrees. Thus, an array substrate may be manufactured without problems.

The composites of the etchant may have variable contents within the above-mentioned ranges, and in the ranges, the same results as FIGS. 3A to 3C may be obtained.

Comparative examples will be explained with reference to the attached drawings.

In a first comparative example, the etchant includes a nitric acid of about 8 wt %, a phosphoric acid of about 38 wt %, an acetic acid of about 16 wt %, a chlorine compound of about 1 wt %, a chlorine stabilizer of about 1 wt %, a pH stabilizer of about 1 wt %, and water of about 35 wt %. That is, in the first comparative example, the content of the phosphoric acid differs from that of the exemplary embodiment of the present invention and is less than about 40 wt %.

Figure 4A:
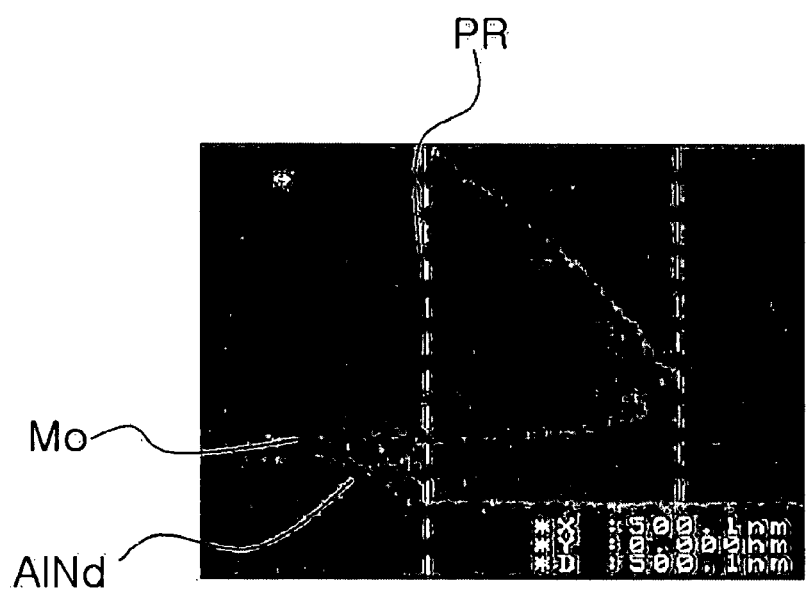
FIG. 4A is a scanning electron microscopy (SEM) image illustrating a cross-section of a double layer of molybdenum and an aluminum alloy wet-etched by an etchant according to a first comparative example.
Figure 4B:
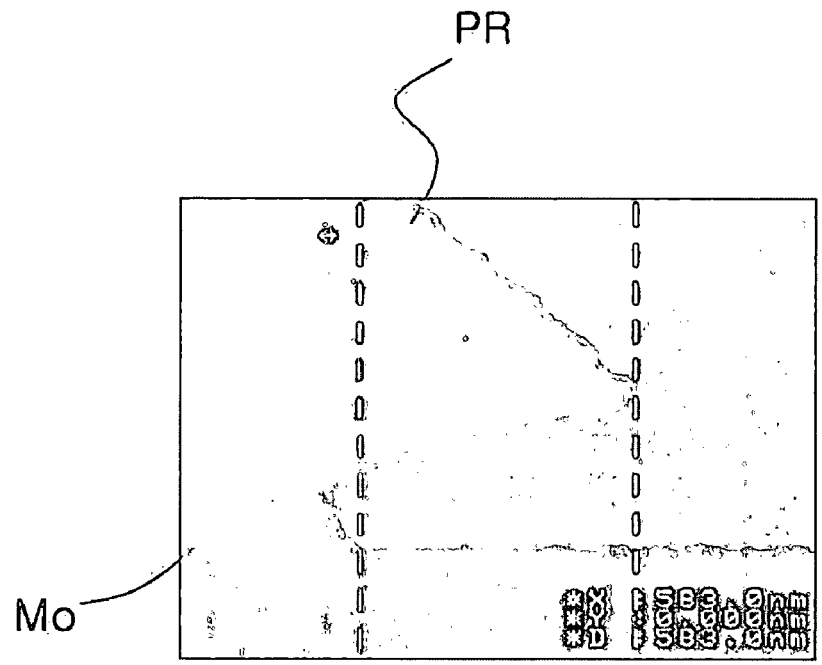
FIG. 4B is a scanning electron microscopy (SEM) image illustrating a cross-section of a molybdenum layer wet-etched by an etchant according to a first comparative example.

FIG. 4A is a scanning electron microscopy (SEM) image illustrating a cross-section of a double layer of molybdenum (Mo) and the aluminum alloy AlNd for a gate electrode wet-etched by the etchant according to the first comparative example. FIG. 4B is an SEM image illustrating a cross-section of a molybdenum (Mo) layer for source and drain electrodes wet-etched by the etchant according to the first comparative example.

In FIG. 4A, the aluminum alloy (AlNd) of the double layer is over-etched, and there is an undercut phenomenon. Thus, when the content of the phosphoric acid is less than 40 wt %, an undercut phenomenon occurs. In FIG. 4B, the molybdenum (Mo) layer has a bad profile that is steeply inclined. When a passivation layer is formed on the source and drain electrodes, the passivation layer is not uniformly formed and may be cut.

In a second comparative example, the etchant includes a nitric acid of about 2 wt %, a phosphoric acid of about 60 wt %, an acetic acid of about 16 wt %, a chlorine compound of about 1 wt %, a chlorine stabilizer of about 1 wt %, a pH stabilizer of about 1 wt %, and water of about 19 wt %. That is, in the second comparative example, the content of the nitric acid differs from that of the exemplary embodiment of the present invention and is less than about 3 wt %.

Figure 5A:
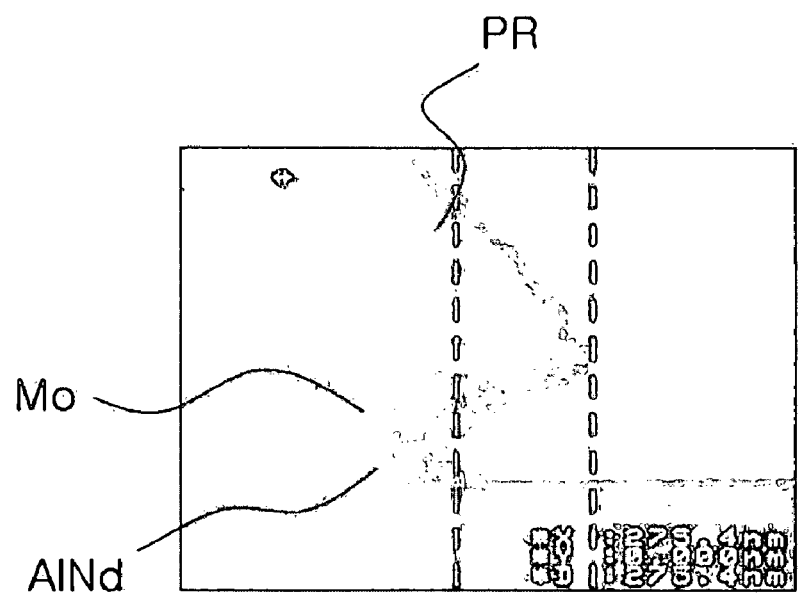
FIG. 5A is a scanning electron microscopy (SEM) image illustrating a cross-section of a double layer of molybdenum and an aluminum alloy wet-etched by an etchant according to a second comparative example.
Figure 5B:
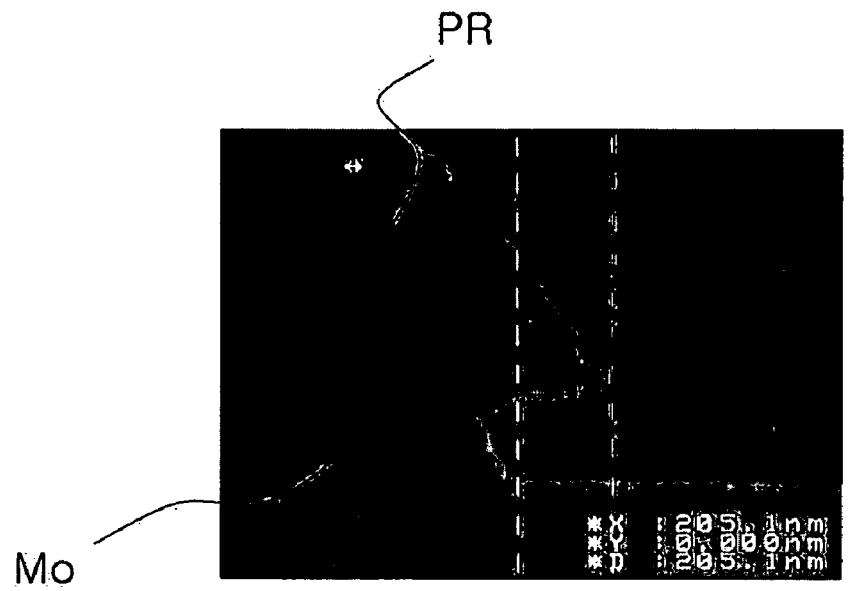
FIG. 5B is a scanning electron microscopy (SEM) image illustrating a cross-section of a molybdenum layer wet-etched by an etchant according to a second comparative example.

FIG. 5A is a scanning electron microscopy (SEM) image illustrating a cross-section of a double layer of molybdenum (Mo) and the aluminum alloy AlNd for a gate electrode wet-etched by the etchant according to the second comparative example. FIG. 5B is an SEM image illustrating a cross-section of a molybdenum (Mo) layer for source and drain electrodes wet-etched by the etchant according to the second comparative example.

In FIG. 5A, the aluminum alloy (AlNd) of the double layer is over-etched, and there is an undercut phenomenon. Thus, when the content of the nitric acid is less than 3 wt %, an undercut phenomenon occurs. In FIG. 5B, the molybdenum (Mo) layer has a bad profile that is steeply inclined.

In a third comparative example, the etchant includes a nitric acid of about 8 wt %, a phosphoric acid of about 60 wt %, an acetic acid of about 4 wt %, a chlorine compound of about 1 wt %, a chlorine stabilizer of about 1 wt %, a pH stabilizer of about 1 wt %, and water of about 25 wt %. That is, in the third comparative example, the content of the acetic acid differs from that of the exemplary embodiment of the present invention and is less than about 5 wt %.

Figure 6:
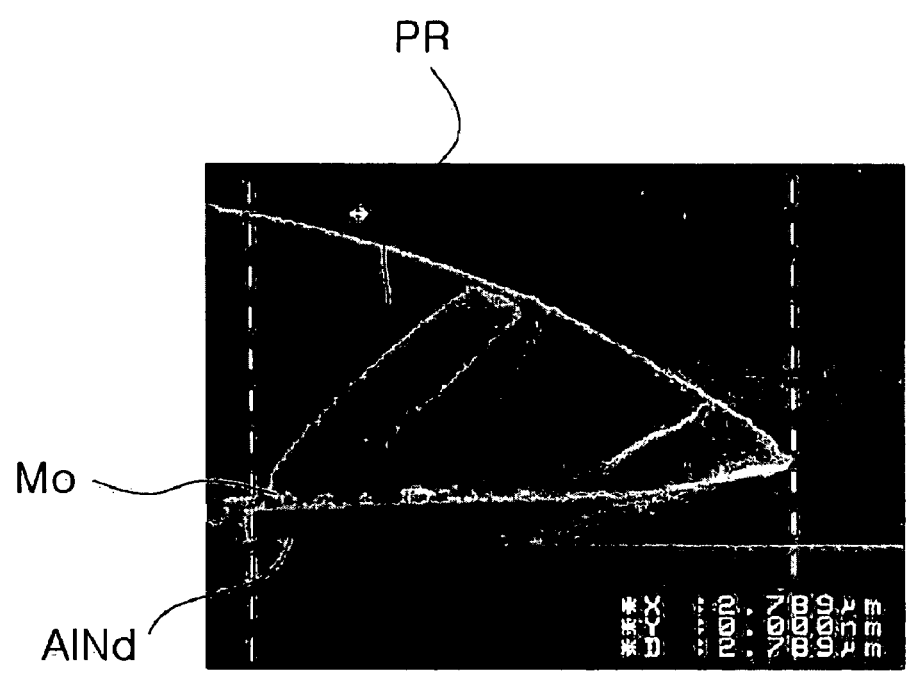
FIG. 6 is a scanning electron microscopy (SEM) image illustrating a cross-section of a double layer of molybdenum and an aluminum alloy wet-etched by an etchant according to a third comparative example.

FIG. 6 is a scanning electron microscopy (SEM) image illustrating a cross-section of a double layer of molybdenum (Mo) and an aluminum alloy AlNd for a gate electrode wet-etched by the etchant according to the third comparative example. In FIG. 6, the aluminum alloy (AlNd) of the double layer is over-etched, and there is an undercut phenomenon. Thus, when the content of the acetic acid is less than 5 wt %, an undercut phenomenon occurs.

In a fourth comparative example, the etchant includes a nitric acid of about 8 wt %, a phosphoric acid of about 60 wt %, an acetic acid of about 16 wt %, a chlorine compound of about 7 wt %, a chlorine stabilizer of about 1 wt %, a pH stabilizer of about 1 wt %, and water of about 7 wt %. That is, in the fourth comparative example, the content of the chlorine compound differs from that of the exemplary embodiment of the present invention and is more than about 5 wt %.

Figure 7:
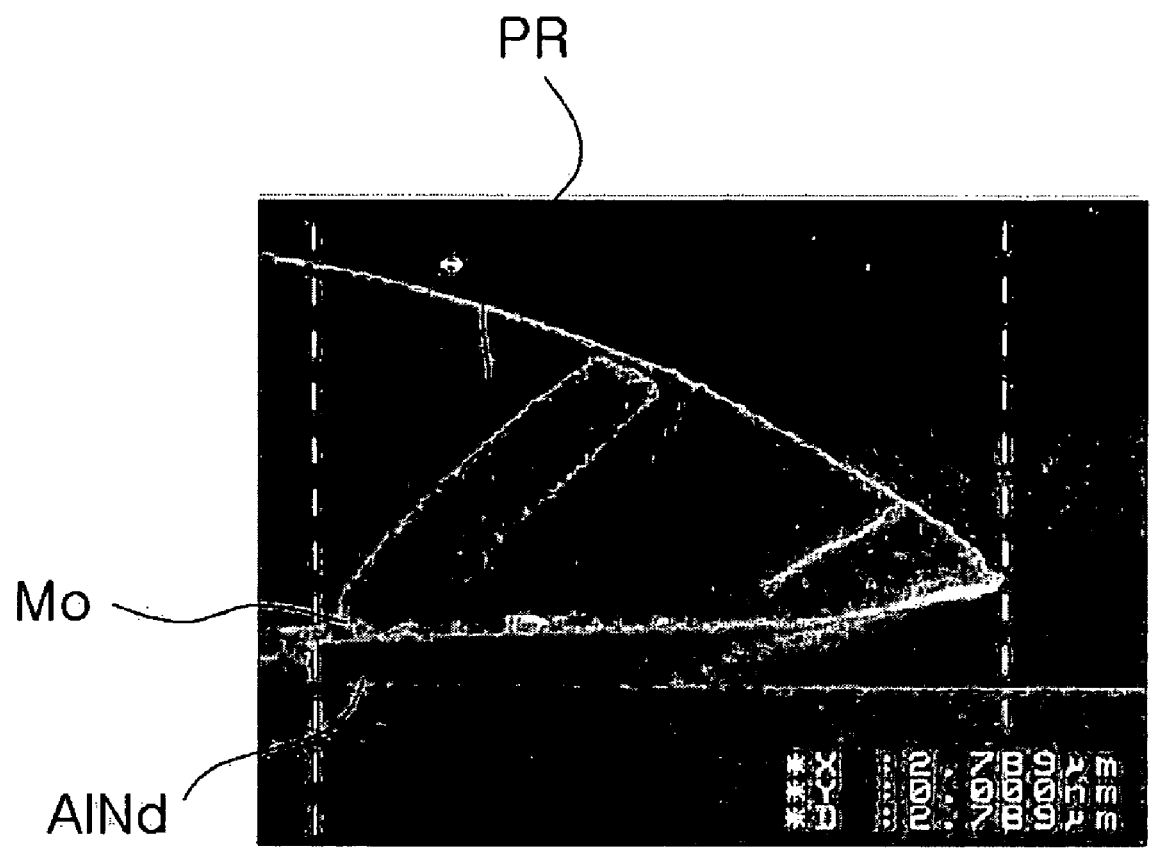
FIG. 7 is a scanning electron microscopy (SEM) image illustrating a cross-section of a double layer of molybdenum and an aluminum alloy wet-etched by an etchant according to a fourth comparative example.

FIG. 7 is a scanning electron microscopy (SEM) image illustrating a cross-section of a double layer of molybdenum (Mo) and an aluminum alloy AlNd for a gate electrode wet-etched by the etchant according to the fourth comparative example.

In FIG. 7, the aluminum alloy (AlNd) of the double layer is over-etched, and there is an undercut phenomenon. Thus, when the content of the chlorine compound is more than 5 wt %, an undercut phenomenon occurs. Accordingly, bad patterns may be formed in subsequent processes.

In a fifth comparative example, the etchant includes a nitric acid of about 8 wt %, a phosphoric acid of about 60 wt %, an acetic acid of about 16 wt %, a chlorine compound of about 1 wt %, a chlorine stabilizer of about 7 wt %, a pH stabilizer of about 1 wt %, and water of about 7 wt %. That is, in the fifth comparative example, the content of the chlorine stabilizer differs from that of the exemplary embodiment of the present invention and is more than about 5 wt %.

Figure 8:
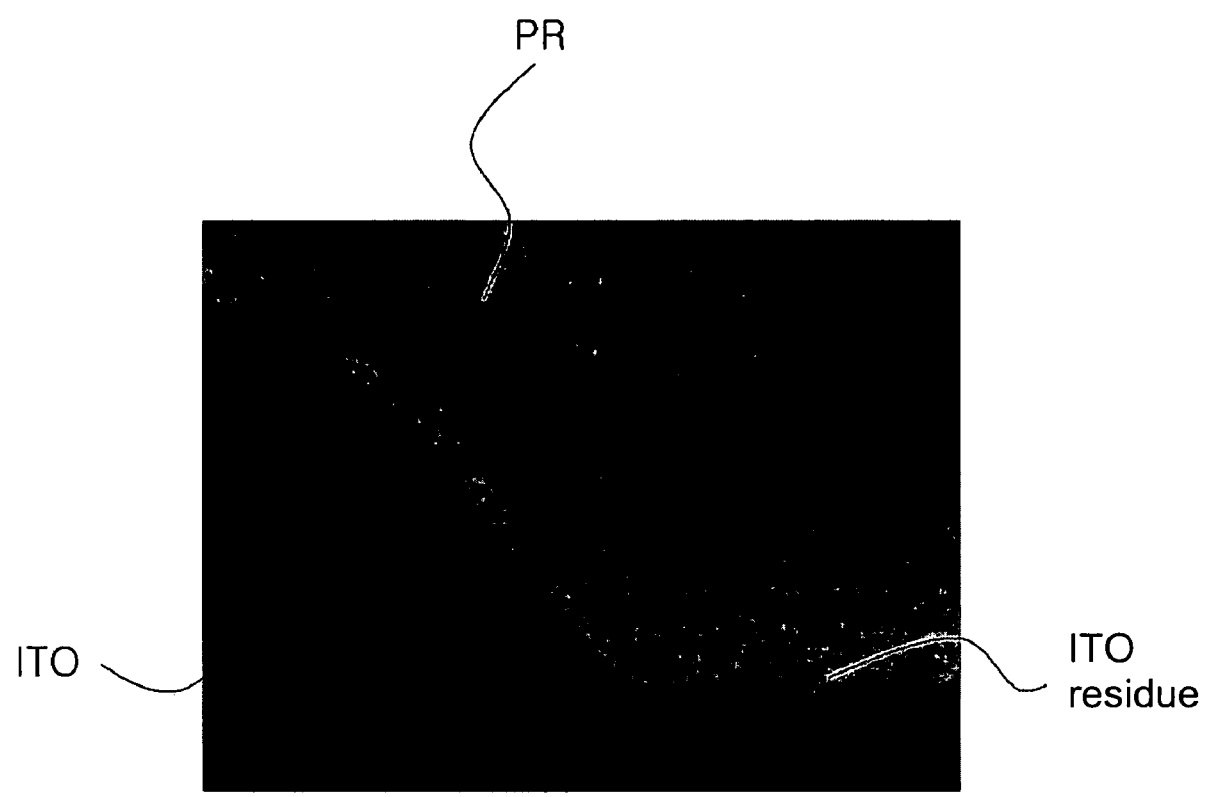
FIG. 8 is a scanning electron microscopy (SEM) image illustrating a cross-section of an indium tin oxide layer wet-etched by an etchant according to a fifth comparative example.

FIG. 8 is a scanning electron microscopy (SEM) image illustrating a cross-section of an indium tin oxide (ITO) layer for a pixel electrode wet-etched by the etchant according to the fifth comparative example.

In FIG. 8, an etch rate of indium tin oxide (ITO) is decreased, and there are residues of indium tin oxide that are not completely removed and therefore remain. Thus, when the content of the chlorine stabilizer is more than 5 wt %, residues of indium tin oxide remain.

In a sixth comparative example, the etchant includes a nitric acid of about 8 wt %, a phosphoric acid of about 60 wt %, an acetic acid of about 16 wt %, a chlorine compound of about 1 wt %, a chlorine stabilizer of about 1 wt %, a pH stabilizer of about 7 wt %, and water of about 7 wt %. That is, in the sixth comparative example, the content of the pH stabilizer differs from that of the exemplary embodiment of the present invention and is more than about 5 wt %.

Figure 9:
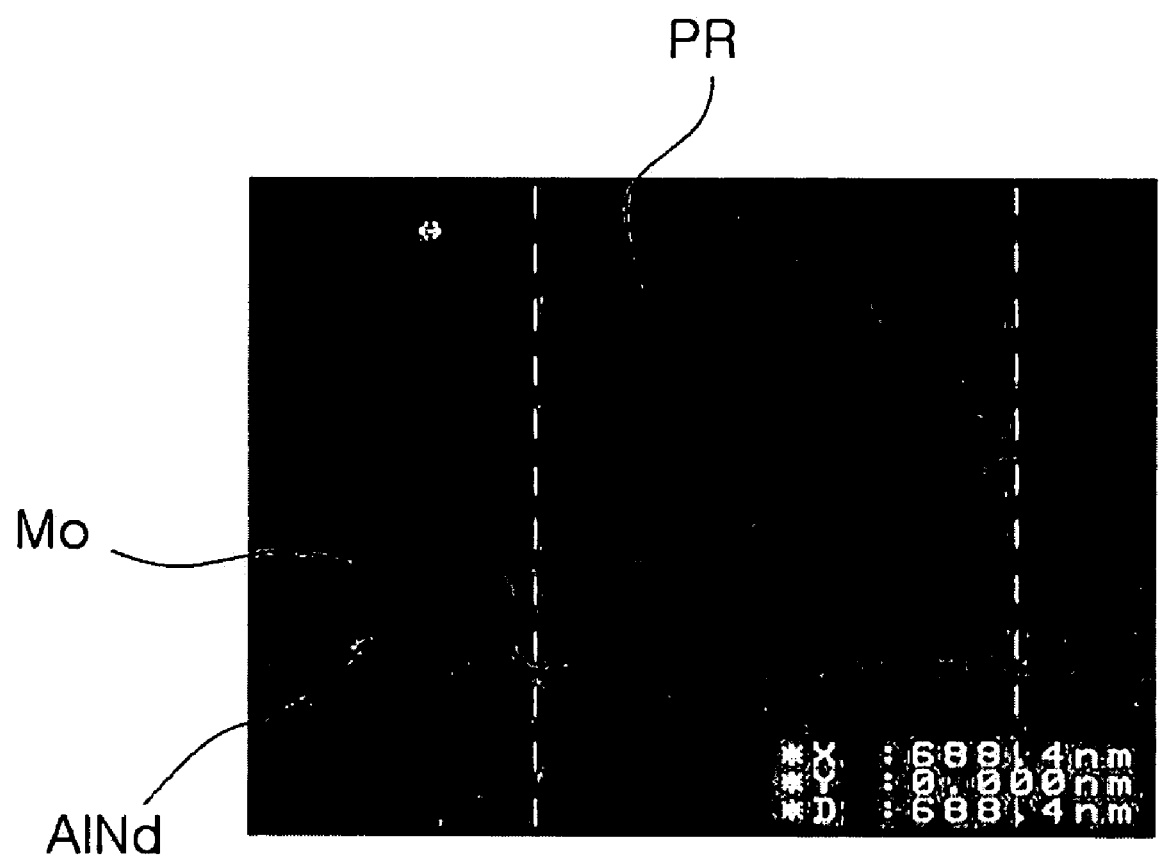
FIG. 9 is a scanning electron microscopy (SEM) image illustrating a cross-section of a double layer of molybdenum and an aluminum alloy wet-etched by an etchant according to a sixth comparative example.

FIG. 9 is a scanning electron microscopy (SEM) image illustrating a cross-section of a double layer of molybdenum (Mo) and the aluminum alloy AlNd for a gate electrode wet-etched by the etchant according to the sixth comparative example.

In FIG. 9, there is an undercut phenomenon in the double layer of molybdenum (Mo) and the aluminum alloy AlNd. Thus, when the content of the pH stabilizer is more than 5 wt %, an undercut phenomenon occurs.

In the present invention, since metallic patterns are formed by a single etchant, manufacturing costs are decreased due to the use of a single wet bath, and productivity is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A manufacturing method of an array substrate for a liquid crystal display device using a composition for removing conductive materials that includes a nitric acid of about 3 to 15 wt %, a phosphoric acid of about 40 to 70 wt %, an acetic acid of about 5 to 35 wt %, a chlorine compound of about 0.05 to 5 wt %, a chlorine stabilizer of about 0.01 to 5 wt %, a pH stabilizer of about 0.01 to 5 wt %, and water of residual quantity, the method comprising:
  forming a gate electrode on a substrate by etching a first metal layer using the composition;
  forming a gate insulating layer on the gate electrode;
  forming a semiconductor layer on the gate insulating layer;
  forming source and drain electrodes on the semiconductor layer by etching a second metal layer using the composition;
  forming a passivation layer on the source and drain electrodes, the passivation layer having a contact hole exposing the drain electrode; and
  forming a pixel electrode on the passivation layer by etching a third metal layer using the composition.

2. The method according to claim 1, wherein the first metal layer is a single layer of aluminum alloy or molybdenum.

3. The method according to claim 1, wherein the first metal layer includes a double layer of aluminum alloy and molybdenum.

4. The method according to claim 1, wherein the second metal layer includes aluminum alloy or molybdenum.

5. The method according to claim 1, wherein the third metal layer includes indium tin oxide.

6. The method according to claim 1, wherein the chlorine compound is dissociated into $Cl^{-1}$.

7. The method according to claim 1, wherein the chlorine compound includes at least one of KCl, HCl, LiCl, $NH_4Cl$, $CuCl_2$, $FeCl_3$, $FeCl_2$, $CaCl_2$, $CoCl_2$, $NiCl_2$, $ZnCl_2$, $AlCl_3$, $BaCl_2$, $BeCl_2$, $BiCl_3$, $CdCl_2$, $CeCl_2$, $CsCl_2$, $H_2PtCl_6$, and $CrCl_3$.

8. The method according to claim 1, wherein the chlorine stabilizer includes at least one of a Zn compound, a Cd compound, a Pb compound, a Ba compound and an oleic acid.

9. The method according to claim 1, wherein the chlorine stabilizer includes at least one of $ZnCl_2$, $Zn(NO_3)_2$, $Zn(CH_3COO)_2$, $Zn(C_{17}H_{35}COO)_2$, $C_2H_2O_4Zn$, $Zn_3(PO_4)_2$, $Zn(CO_3)$, $Cd(CH_3COO)_2$, $CdCl_2$, $CdI_2$, $Cd(NO_3)_2$, $Cd(CO_3)$, $Pb(CH_3COO)_2$, $C_{12}H_{10}O_{14}Pb_3$, $PbI_4$, $Pb(NO_3)_2$, $PB(C_{17}H_{35}COO)_2$, $Ba(CH_3COO)_2$, $BaCO_3$, $BaCl_2$, $BaI_2$, $Ba(NO_3)_2$, and $Ba(H_2PO_4)_2$.

10. The method according to claim 1, wherein the pH stabilizer is dissociated into OH—.

11. The method according to claim 1, wherein the pH stabilizer includes at least one of NaOH, KOH, LiOH, $Ca(OH)_2$, $Al(OH)_3$, $Mg(OH)_2$, $Ba(OH)_2$, $Co(OH)_2$, $Cu(OH)_2$, $Ni(OH)_2$, $Zr(OH)_2$, and $Zn(OH)_2$.

12. The method according to claim 1, wherein the water is pure water filtered through an ion exchange resin.

13. The method according to claim 2, wherein the aluminum alloy is AlNd.

14. The method according to claim 1, wherein the etching occurs at a temperature of 30-50 degrees Celsius.

15. The method according to claim 14, wherein etching the first metal layer includes an etching duration based upon a thickness and type of material of the first metal layer.

16. The method according to claim 14, wherein etching the second metal layer includes an etching duration based upon a thickness and type of material of the second metal layer.

17. The method according to claim 14, wherein etching the third metal layer includes an etching duration based upon a thickness and type of material of the third metal layer.

18. The method according to claim 3, wherein the aluminum alloy is AlNd.

19. The method according to claim 4, wherein the aluminum alloy is AlNd.

20. The method according to claim 2, wherein the second metal layer includes aluminum alloy or molybdenum.

21. The method according to claim 20, wherein the third metal layer includes indium tin oxide.

22. The method according to claim 3, wherein the second metal layer includes aluminum alloy or molybdenum.

23. The method according to claim 22, wherein the third metal layer includes indium tin oxide.

* * * * *